No. 893,574. PATENTED JULY 14, 1908.
J. M. DODGE.
MOVING PLATFORM OR INCLINED PLANE.
APPLICATION FILED OCT. 11, 1905.

2 SHEETS—SHEET 1.

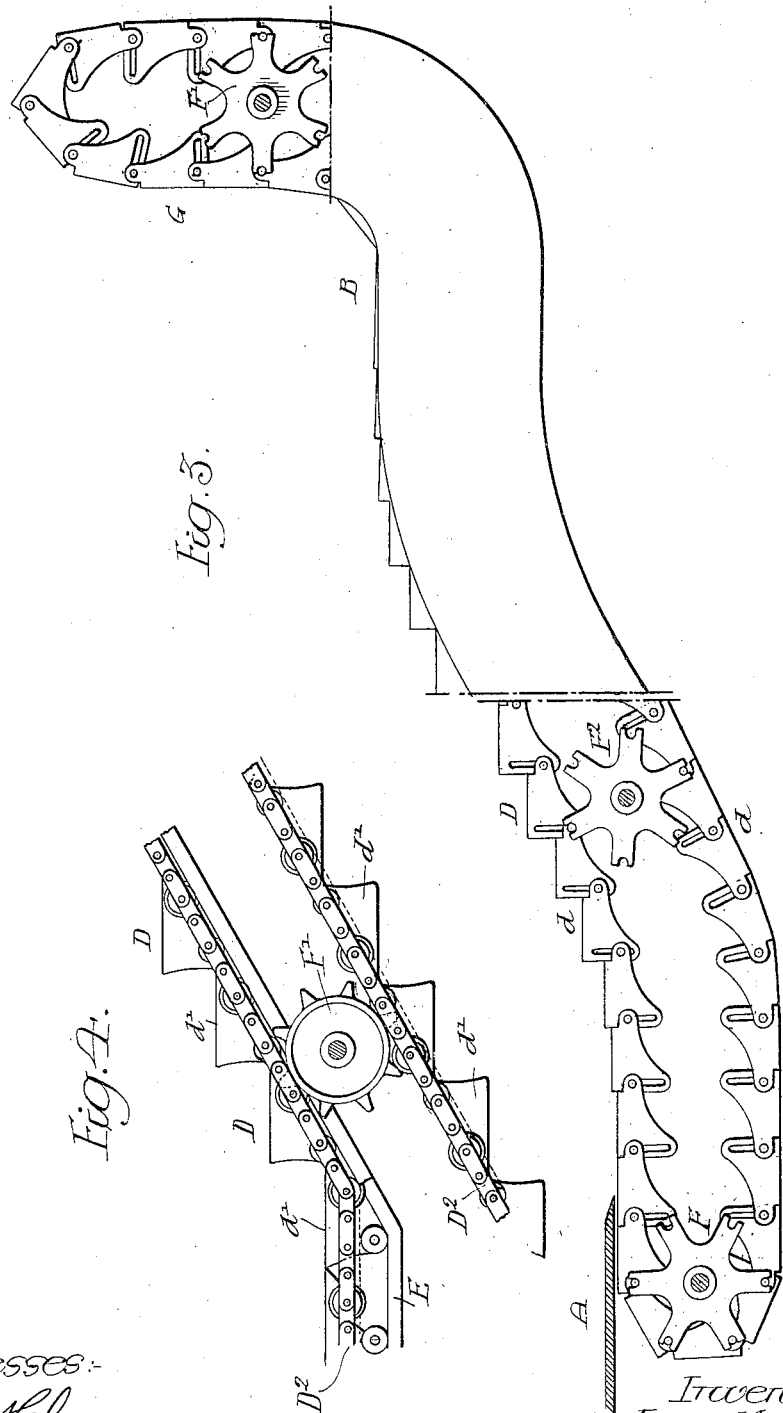

UNITED STATES PATENT OFFICE.

JAMES M. DODGE, OF PHILADELPHIA, PENNSYLVANIA, ASSIGNOR TO THE STAIR LIFT COMPANY, OF CAMDEN, NEW JERSEY, A CORPORATION OF NEW JERSEY.

MOVING PLATFORM OR INCLINED PLANE.

No. 893,574.     Specification of Letters Patent.     Patented July 14, 1908.

Original application filed January 22, 1898, Serial No. 667,634. Renewed November 21, 1901, Serial No. 83,186.
Divided and this application filed October 11, 1905. Serial No. 282,241.

*To all whom it may concern:*

Be it known that I, JAMES M. DODGE, a citizen of the United States, residing in Philadelphia, Pennsylvania, have invented certain Improvements in Moving Platforms or Inclined Planes, (being a division of my application filed January 22, 1898, under Serial No. 667,634,) of which the following is a specification.

My invention relates to certain improvements in moving platforms or inclined planes.

This application is a division of my application which resulted in Patent 802,847, October 24, 1905.

The main object of the present invention is to so construct a moving platform or inclined plane having either a flat surface or steps when the same is composed of enchained sections, that it will be safe and convenient.

A further object is to drive the sections more effectually than usual and distribute the load.

These objects I attain in the following manner, reference being had to the accompanying drawings, in which:—

Figure 1:
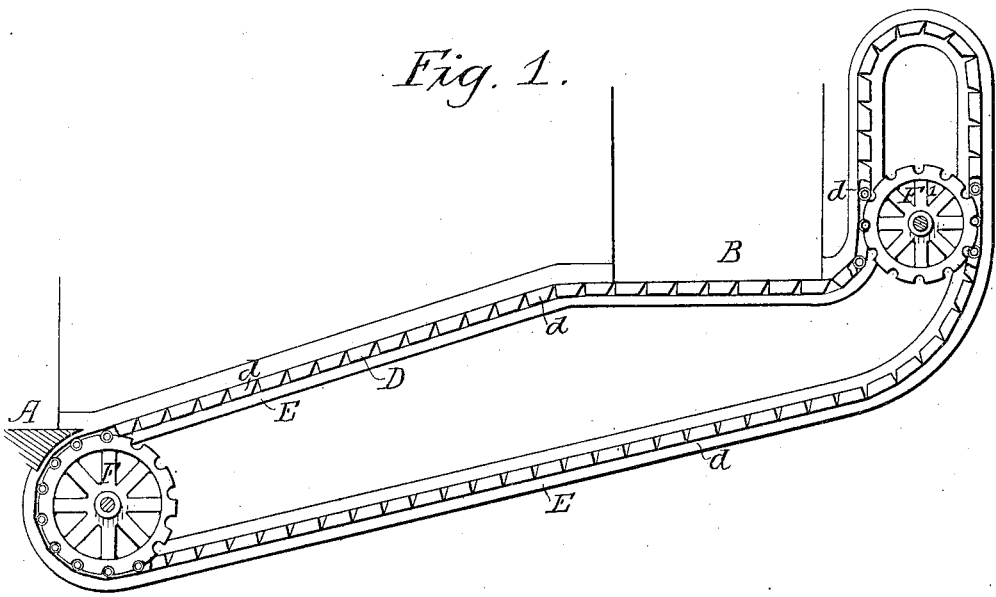
Figure 2:
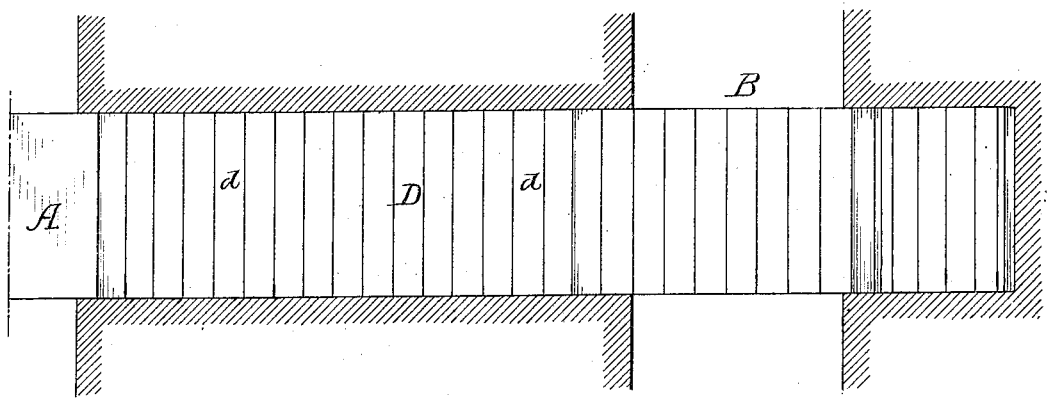

Figure 1, is a view showing a traveling inclined plane illustrating my invention; Fig. 2, is a plan view of Fig. 1; Fig. 3, is a longitudinal sectional view of a traveling stairway illustrating my invention; and Fig. 4, is a view of a portion of a stairway illustrating my invention.

Prior to my invention there were three types of inclined carriers for passengers, namely:—the inclined moving platform driven from the upper end which consisted of a series of enchained flat sections driven by sprocket wheels engaging the sections, the endless belt passing around the upper driven sprocket wheel. Another type of conveyer was made up of a series of step sections, the step sections being connected by chains and the moving portion was driven by sprocket wheels engaging the chains at the upper end, the chains passing around said sprocket wheels. A third construction was one in which the steps were formed on the inclined portion and these steps were driven by a wheel pushing the step sections forward, the driving mechanism being at the lower end of the stairway.

The present invention relates particularly to certain improvements in the class of inclined carriers in which the sections are enchained.

As shown in the drawings I may extend the moving sections at an abrupt angle for a considerable distance above the platform or floor to form an abutment, as illustrated and claimed in my reissue Patent No. 12,036, dated September 30th, 1902.

Fig. 1 of the drawings is a view of a moving inclined plane. A represents a lower floor or fixed platform, B an upper floor or platform and D the traveling inclined plane made up of a series of enchained sections $d$ adapted to ways E on each side. F is a driving sprocket wheel at one end of the inclined plane and F' is a driving sprocket wheel preferably engaging both the carrying and return runs and situated at a point intermediate the ends of the stairway and, as shown in Fig. 1, at the point where the said sections change direction of movement. In long runs more of these intermediate driving wheels may be used if necessary. As the sections are adapted to suitable guides the several driving wheels are so operated that they will turn in unison and the purpose of the additional driver or drivers is to relieve the primary driver, especially at the points where the sections change direction of movement so that the apparatus will work evenly and without loss of power. There may be also an abutment at both ends of the inclined plane if desired, so that the direction of travel of the endless carrier can be reversed.

A series of drivers may be used in connection with a moving stairway as illustrated in Fig. 4, in which the step sections $d'$ are connected together by chains $D^2$ to form the endless carrier D. In this instance the driving wheel would be at the upper end and intermediate driving wheel F' may be located at the point where the sections are deflected and may engage the return run of the endless carrier, as shown.

In Fig. 3, I have shown a moving stairway having the step sections which are pushed from a driving wheel F at the lower end, the step sections being enchained. The other driving wheels F', F² are inserted at the points where the sections are deflected.

It will be understood that a series of drivers may be used in connection with a moving stairway or inclined plane, and in carrying out my invention I may use enchained step sections either pulled or pushed.

I claim as my invention:—

1. In a device of the class described, the combination with a series of sections, said sections being enchained to form an endless carrier, and a sprocket wheel interposed between the ascending and descending series of step sections intermediate the ends thereof and meshing with the moving portion, substantially as described.

2. In a device of the class described, the combination of a series of sections, said sections being enchained to form an endless carrier, ways in which the said sections travel, and a sprocket wheel interposed between the ascending and descending series of said sections and intermediate the ends thereof and meshing with the moving portions on both the carrying and return runs, substantially as described.

In testimony whereof, I have signed my name to this specification, in the presence of two subscribing witnesses.

JAMES M. DODGE.

Witnesses:
WILL. A. BARR,
JOS. H. KLEIN.